Patented July 11, 1933

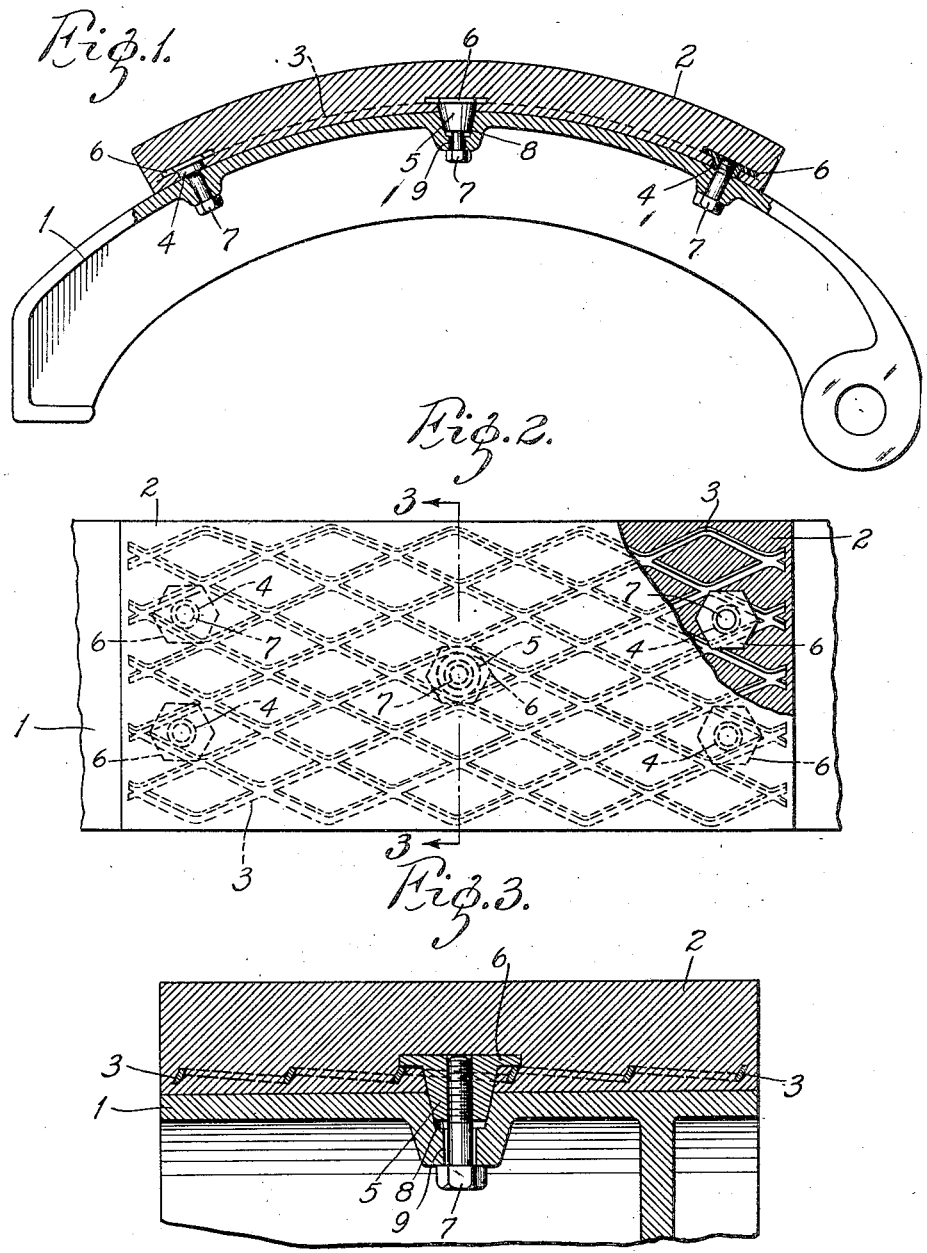

1,917,820

UNITED STATES PATENT OFFICE

TRACY F. BRACKETT, OF HIGHLAND PARK, MICHIGAN, ASSIGNOR TO THE TIMKEN-DETROIT AXLE COMPANY, OF DETROIT, MICHIGAN, A CORPORATION OF OHIO

BRAKE MEMBER

Application filed December 4, 1931. Serial No. 578,919.

This invention relates to linings and facings of brakes, clutches and the like. The principal objects of the invention are to devise means whereby the stresses arising from service will be decentralized or dissipated throughout the mass of the lining material and thereby prevent rupture and increase the life of such material. Another principal object is to relieve the bolts or other devices, which secure the lining or facing to its mount, of the stresses which tend to shear such fasteners during braking action. The invention consists principally in embedding in the lining material open-work reinforcement and headed ferrules, which extend through said reinforcement and are threaded or otherwise adapted for cooperating with the fastening devices which hold such lining to its mount. It also consists in extending such a ferrule or ferrules beyond the face of the lining in a recess or recesses in the mount with the sides of such ferrules in contact with the walls of the recesses. It also consists in the parts and in the combinations of parts and arrangements hereinafter described and claimed.

In the accompanying drawing, wherein like reference numerals refer to like parts wherever they occur, Fig. 1 is a view of a brake shoe embodying my invention, said view being partially in elevation and partially in longitudinal section, Fig. 2 is a face view of such brake shoe with its ends broken away and with the embedded portions indicated by broken lines; and Fig. 3 is a cross sectional view on the line 3—3 of Fig. 2.

As illustrated in Fig. 1, a segmental metal brake shoe 1 of common type is provided on its periphery with an arcuate lining 2 for cooperation with the inner surface of a cylindrical brake drum (not shown).

The brake lining is made of a suitable composition that may be worked plastically and afterwards hardened, such, for instance, as the composition set forth in my Patent No. 1,851,036. Embedded in the body mass and close to the braking surface thereof is a strip of openwork reinforcing material 3, such as expanded metal or other suitable mesh work. Also embedded in the body mass and extending through the reinforcement are ferrules 4, 5, whose inner ends are provided with heads or flanges 6 of sufficient width to overlap the strands of the reinforcing mesh work.

In the construction illustrated in Fig. 1, the outer end of some ferrules 4 terminate flush with or short of the braking surface of the lining, while the ferrule 5 projects appreciably beyond the braking surface of the lining and is coned or tapered for cooperation with the mount as hereinafter described. In both cases, the furrule is provided with an interior screw threaded adapted for engagement by a locking device, such as a cap screw 7. Such cap screws extend radially through holes provided therefor in the peripheral portion of such shoe; and serve to hold the lining flatwise against its mount. When no provision is made to the contrary, the circumferentially acting stresses arising from application of the brake are imposed upon and resisted by such screws, as is the case with the screws 4 which enter ferrules that do not project beyond the lining. When it is desired to relieve the screws of such stress, the peripheral portion of the brake shoe is provided with a conical recess or recesses 8 in position for the projecting end of a ferrule to enter; and such end is coned to insure centering in and engagement by such ferrule with the wall of such recess. In this case, the hole 9 for the radially disposed fastening screw is located in the bottom of the recess and is made of larger diameter than such screw to afford clearance therefor. In this way, the ferrule is adapted to take care of the shearing stress occasioned by the application of the brake, and the radially disposed fastening screw is relieved from the circumferential stress due to braking action and perform only the duty of holding the lining radially against its mount.

In operation, the lining material picks up certain stresses that are occasioned by braking action; and the reinforcing material serves to distribute such stress throughout the mass and thereby reduce the intensity of such stress, which might otherwise become excessive on occasions. There is considerable concentration of stress in the regions adjacent to the ferrules; but the fact that the ferrules extend through the mesh-work with their wide heads overlapping and interlocking with the strands of the mesh-work adequately provides for such concentrated stresses. And, as stated above, the engagement of the projecting end of an embedded ferrule with the wall of a recess in its mount relieves its fastening screw of the shearing stresses occasioned by braking action. Consequently, a brake lining embodying my invention will maintain its shape better, wear more evenly and be more durable than brake linings now in use.

While I have described my invention as applied to a brake, it is obviously applicable to clutches also. Likewise, while I have shown my lining with some ferrules projecting and some not, it is obvious that they all may project or not project.

What I claim is:

1. The combination of a metal brake member and a composition lining detachably mounted thereon, said composition brake lining having expanded metal reinforcement embedded therein and also having at least partially embedded therein interiorly threaded ferrules which extend through the meshes of such metal and have heads which overlap the strands thereof, screws cooperating with the threads of said ferrules to clamp said lining against said brake member, and means for resisting circumferential stresses caused by braking action, said means comprising a radially disposed part whose side engages both said lining and said member.

2. A composition brake lining having openwork metal reinforcement embedded therein and also having headed metal ferrules extending through such reinforcement with their heads overlapping such reinforcement and with their outer ends projecting a substantial distance beyond the composition and adapted for direct mechanical engagement with a supporting member, said ferrules being internally threaded for cooperation with fastening screws.

3. The combination of a metal brake member and a composition lining detachably mounted thereon, said composition lining having open-work metal embedded therein adjacent to its back surface and also having embedded therein threaded ferrules which extend through the holes of such open-work and have enlarged heads overlapping the edges of said holes, screws cooperating with the threads of said ferrules to clamp said lining against said brake member, and means for resisting circumferential stresses caused by braking action, said means comprising a radially disposed part whose side engages both said lining and said member.

4. The combination of a metal brake member and a composition lining detachably mounted thereon, said metal member having a recess and said lining having a ferrule which is partially embedded therein but projects therefrom into direct locking engagement with the wall of said recess to resist the shearing stress occasioned by braking action, said ferrule being threaded to receive a threaded fastener.

5. The combination of a metal brake member and a composition lining detachably mounted thereon, said metal member having a recess and said lining having embedded therein openwork metal reinforcement and a ferrule which ferrule extends through said reinforcement and into engagement with the wall of said recess, and a securing device which extends through the metal member into engagement with said ferrule.

6. The combination of a metal brake member and a composition lining detachably mounted thereon, said metal member having a recess and said lining having embedded therein openwork metal reinforcement and a headed ferrule which ferrule extends through said reinforcement and projects into engagement with the wall of said recess, and a securing device which extends through the metal member into engagement with said ferrule, the sides of said securing device having clearance with respect to the wall of said recess.

Signed at Detroit, Michigan, this 30th day of November, 1931.

TRACY F. BRACKETT.